United States Patent

Roberts

[11] Patent Number: 5,900,715
[45] Date of Patent: May 4, 1999

[54] PORTABLE UNIT RECHARGING RACK

[75] Inventor: Ronald D. Roberts, North Vancouver, Canada

[73] Assignee: Sportsound, Inc., Carson City, Nev.

[21] Appl. No.: 08/902,347

[22] Filed: Jul. 29, 1997

[51] Int. Cl.[6] .................................................. H01M 10/46
[52] U.S. Cl. ........................................... 320/115; 320/119
[58] Field of Search .................................... 320/107, 109, 320/111, 113, 114, 115, 116, 119, 120, 137, FOR 101, FOR 114, FOR 116

[56] References Cited

U.S. PATENT DOCUMENTS

| D. 339,789 | 9/1993 | Foster et al. . |
| 3,696,283 | 10/1972 | Ackley, III . |
| 4,647,831 | 3/1987 | O'Malley et al. . |
| 4,739,242 | 4/1988 | McCarty et al. . |
| 5,039,929 | 8/1991 | Veistroffer et al. . |
| 5,124,532 | 6/1992 | Hafey et al. . |
| 5,367,242 | 11/1994 | Hulman . |
| 5,548,200 | 8/1996 | Nor et al. ................................. 320/109 |
| 5,773,954 | 6/1998 | Van Horn ................................. 320/137 |

Primary Examiner—Edward H. Tso
Attorney, Agent, or Firm—Marger Johnson & McCollom, P.C.

[57] ABSTRACT

A recharging apparatus for charging a plurality of units coupled thereto. The apparatus includes a housing having parallel first and second elongate slots defined therein and first and second elongate magnetic strips disposed within their respective slots. First and second elongate electrodes are disposed within the slots adjacent respective first and second magnetic strips, wherein each of the electrodes have an upper edge which extends beyond a surface of the housing for electrical contact with respective electrodes on the unit to be charged. Charging contacts are electrically coupled to supply a potential difference across the first and second electrodes and to consequently charge the rechargeable units mounted magnetically to the housing.

12 Claims, 2 Drawing Sheets

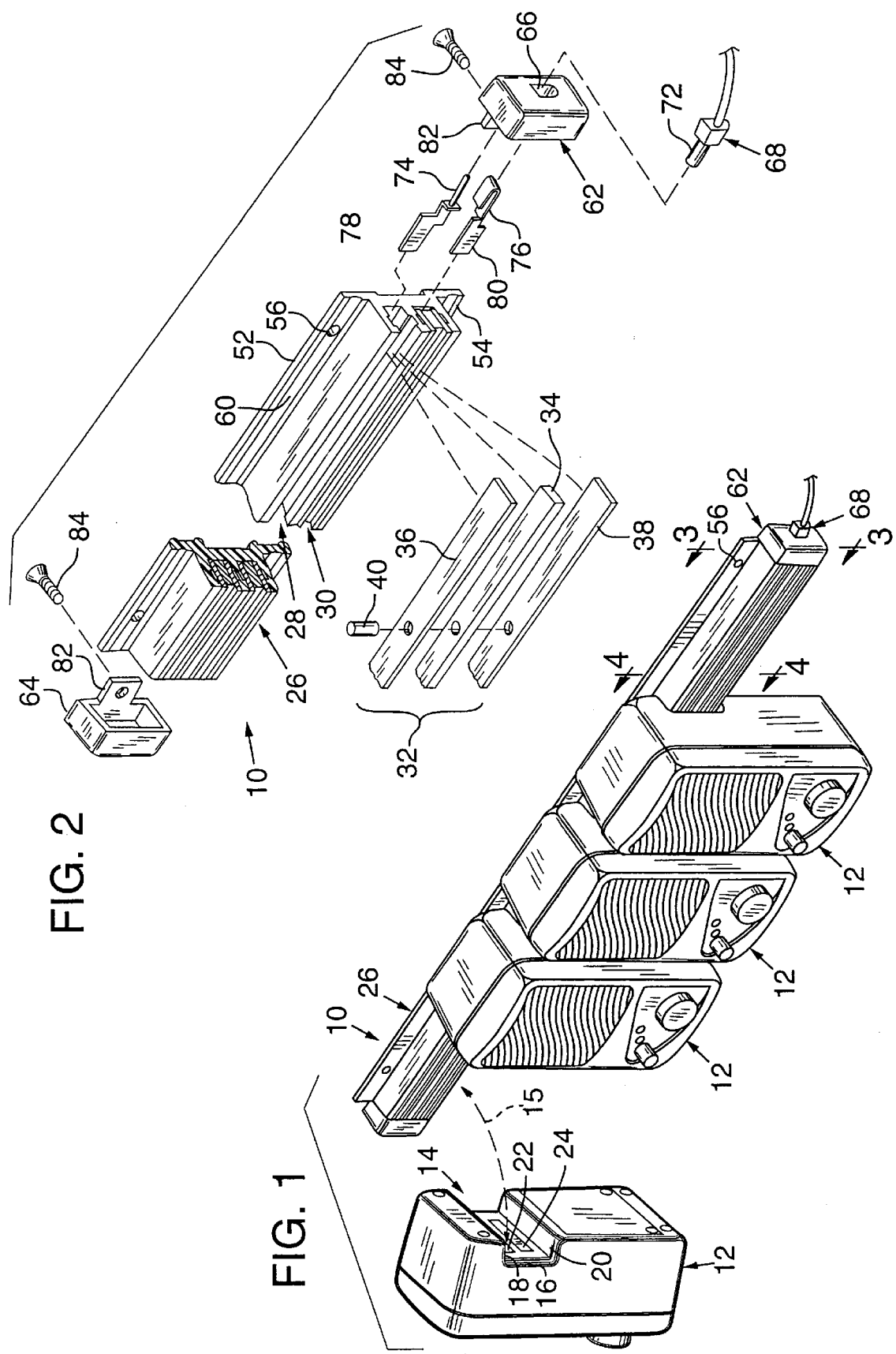

PORTABLE UNIT RECHARGING RACK

BACKGROUND OF THE INVENTION

This invention relates generally to charging systems for battery operated, cordless tools, appliances and the like and more particularly to such a device used to charge a plurality of portable speaker units at the same time.

Rechargeable appliances have been utilized in the prior art. Such devices typically have a rechargeable battery, such as nickel-metal hydride, lithium or other types known in the art, which are depleted from remote use of the device. The battery may then be recharged and the device used again. Such devices are typically referred to as "cordless" since once the battery is charged, the device may be used without the need of a power cord plugged into a fixed outlet. The convenience that these devices offer the user has contributed to their growing popularity since a user no longer has to rely on the proximity of a power outlet to use the rechargeable device.

Each such rechargeable device typically includes its own recharging adaptor or "rack" which couples between a power outlet and the device and supplies a measured amount of electrical power thereto. Recharging systems are known in the art which recharge a plurality of units simultaneously. One such multistation recharging system is U.S. Pat. No. 5,039,929 to Veistroffer et al. which discloses a battery recharging rack for charging nickel cadmium batteries. The Veistroffer recharging rack includes an elongate rail to which a plurality of battery receptacles are connected. The bottom of the receptacles are connected to positive and negative electrodes which transfer current to a battery received within the receptacle.

Another such multi-unit recharging system is disclosed in U.S. Pat. No. 4,739,242 to McCarty et al. which describes a multistation, modular charging device comprised of units which couple together as needed and are capable of charging multiple rechargeable tools from a single power cord/source. Each charging unit has internal lateral metallic strips which contact the ends of adjacently placed units for electrically connecting multiple units together.

The Veistroffer and McCarty recharging systems are typical of those known in the art whereby they are made up of multiple stations or receptacles each of which will only fit a single one of a certain type of device. For instance, the Veistroffer rack would not allow the rechargeable devices to be placed anywhere along the rack but only in fixed receptacles. Additionally, the rechargeable elements are maintained in contact with the electrodes via gravity only. Thus, the unit must be used upright or else the rechargeable elements will lose contact with the charging electrodes.

Accordingly, a need remains for a recharging system which solves the limitations of the prior art.

SUMMARY OF THE INVENTION

It is, therefore, an object of the invention to provide a recharging system for a plurality of cordless devices, such as battery operated speakers, at the same time.

Another object of the invention is to maintain electrical contact between the cordless devices and the recharging system no matter how the device is situated.

A further object of the invention is to allow placement of the cordless devices to be charged anywhere along the recharging system instead of being limited to placement in only one of a series of distinct receptacles for the devices.

The invention is a recharging apparatus for charging a plurality of units coupled thereto. The apparatus constructed according to a preferred embodiment of the invention includes a housing having parallel first and second elongate slots defined therein. The recharging apparatus further includes coupling means disposed in said slots for selectively attaching and detaching a plurality of rechargeable units to the housing. The coupling means include a first elongate magnetic strip sandwiched between a first pair of electrically conducting rails and a second elongate magnetic strip sandwiched between a second pair of electrically conducting rails. Finally, the apparatus includes charging means for applying a potential difference between said first pair of electrically conducting rails relative to said second pair of electrically conducting rails.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a perspective view of the recharging rack constructed according to the invention in use with rechargeable, battery-operated speaker units.

FIG. 2 is a partially exploded perspective view of the recharging rack of FIG. 1.

DETAILED DESCRIPTION

Figure 3:
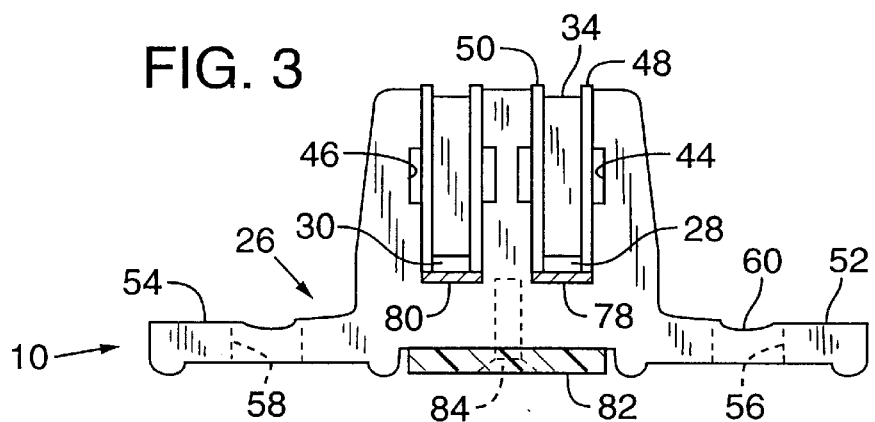
FIG. 3 is a side elevation sectional view of the recharging rack of FIG. 1, taken along lines 3—3.

FIG. 1 shows a recharging rack at 10 constructed according to a preferred embodiment of the invention. Also shown are a plurality of rechargeable units, such as detached battery operated speaker unit 12, which are magnetically mountable on rack 10 as described in more detail below. As the preferred embodiment of rack 10 is given to a rectangular structure as shown in FIG. 1, the rechargeable units include a notched cutout 14 along the backside of the unit which receives rack 10 when mounted thereon, as when moved toward the rack along dashed line 15. Cutout 14 includes a bottom wall 16 bounded by two side walls 18,20. Mounted on bottom wall are two spaced metal plates or electrodes 22,24. Though not the thrust of this invention, it is understood that speaker unit 12 includes charging circuitry for regulating the flow of electricity conducted from rack 10 through electrodes 22,24 and into a rechargeable battery contained within unit 12.

Turning to FIG. 2, the rack 10 comprises an elongate extruded plastic frame or housing 26 having two slots 28,30 running longitudinally along the length of the frame. Each of slots 28,30 receive a conductive magnetic assembly or coupling means, shown generally at 32, which includes a flexible magnetic bar or strip 34 sandwiched between two conductive contact strips or rails 36,38. Rails 36,38 may be made of a suitably conductive material such as steel or copper. Each part of the assembly can be affixed to one another using spring pins, such as pins 40,42 (shown best in FIG.4), received through aligned bores in magnetic strip 34 and rails 36,38.

Figure 4:
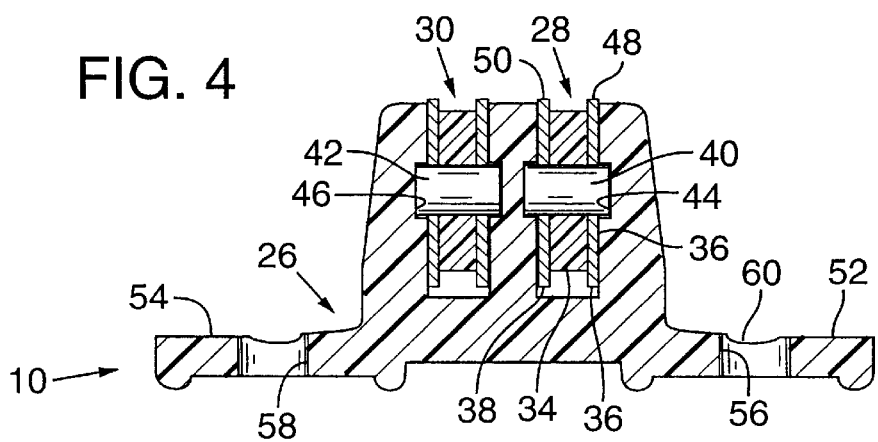
FIG. 4 is a side elevation sectional view of the recharging rack of FIG. 1, taken along lines 4—4.

FIGS. 3 and 4 show respective side views taken along different sections of the housing 26. As will be appreciated, each of the slots 28,30 includes respective cutout portions 44,46 which run the length of the slot that are sized to receive pins 40,42 as shown in FIG. 2. In this way, the rails 36,38 can be suspended within slot 28 so that a top edge of the rails, such as edges 48,50, extend beyond a top surface of the housing 26. It is also preferred that the magnetic strip 34 which is sandwiched between rails 36,38 be spaced from the top edges 48,50 of the rails. Thus, a rechargeable unit placed on rack 10 so that the electrodes 22,24 of the unit contact the electrically charged rails in slots 28,30 would not contact the magnetic strip. However, the magnetic strip, such as strip 34, should be disposed in close enough proximity to the rechargeable unit so that the unit is held in place on the recharging rack 10 by magnetic forces.

Housing 26 also includes means for attaching the housing to a ceiling, wall or support comprising wings 52,54 which extend laterally from opposed sides of the housing along a substantial length thereof. The wings can include one or more bores, such as bores 56,58, through which securing elements such as screws (not shown) are received. Each of the wings can also include a pilot channel, such as channel 60 which has sloping sides ending in a low portion of the channel for guiding a screw therein.

Figure 5:
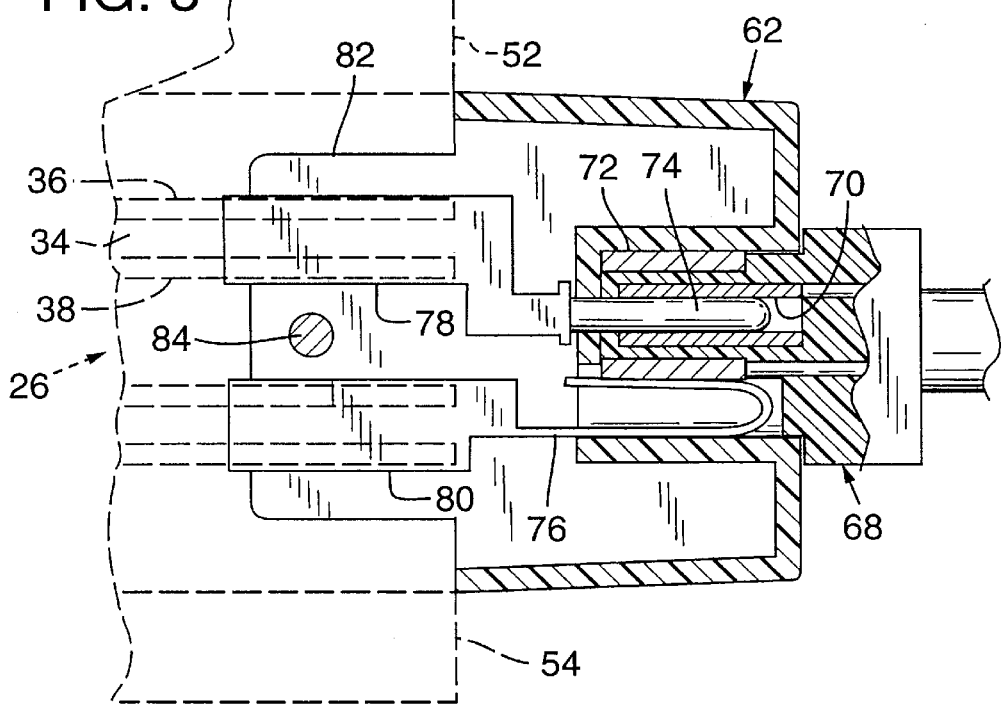
FIG. 5 is a top plan sectional view of the charging contact means of the rack of FIG. 1.

The housing 26 is bounded by endcaps 62,64. FIG. 5 shows endcap 62 which incorporates the electrical coupling necessary to apply a potential difference across the coupling means 32 in slots 28,30. Endcap 62 includes a cutout portion 66 adapted to receive the plug 68 of an AC adaptor, such as those known in the prior art which plugs into an AC power source and converts it to DC power. Plug 68 includes inner and outer conductive surfaces 70,72 defining positive and negative electrodes. A pin 74 and a sprung contact 76 extend through an opening in the endcap cutout portion 66 in spaced relation to one another to electrically couple with respective inner and outer electrodes 70,72. Sprung contact 76 is preferably formed of a metal strip bent toward the pin 74 and is adapted via spring action of the strip to bias against the outer conductive surface 72 of plug 68 when received within cutout 66.

The pin 74 includes a metal plate 78 which electrically couples the pin to the conducting rails 36,38 received within slot 28. Similarly, sprung contact 76 includes a metal plate 80 for electrically coupling the contact to the conductive rails received in slot 30. This is best shown in FIG. 3 where plates 78,80 are in electrical contact with a bottom edge of the respective rails. Both of these plates 78,80 can be sprung or bowed upward to maintain contact with the rails. Endcap 62 includes a tab 82 which extends under the rack housing 26 and is secured thereto, as via screw 84.

In use, a transformer (not shown) converts AC current into DC and feeds the current into the rack 10 via endcap 44 whereby a positive polarity is established through the assembly in slot 28 and a negative polarity is established in the assembly in slot 30.

When mounted, electrode plates 22,24 of the speaker unit 12 contact respective conductive rails, such as those in assembly 32 of the rack 10. A circuit is thus completed and the nickel metal hydride batteries within the speaker unit are slowly recharged as by prior art means.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A recharging apparatus for charging a plurality of units coupled thereto, the apparatus including:

a housing having parallel first and second elongate slots defined therein;

first and second elongate magnetic strips disposed within said respective slots;

first and second elongate electrodes disposed within said respective slots adjacent said first and second magnetic strips, each of said first and second electrodes being electrically isolated from each other and having an upper edge which extends beyond a surface of the housing for electrical contact with respective electrodes on the unit to be charged; and charging contact means electrically coupled to said first and second electrodes for supplying a potential difference across said first and second electrodes.

2. The recharging apparatus of claim 1 further including means for attaching said housing to a ceiling, wall or support comprising wings extending from opposed sides of the housing along a substantial length of the housing.

3. The recharging apparatus of claim 2 wherein the wings include a pilot channel defined along an upper surface thereof and having sloping sides ending in a low portion of the channel.

4. The recharging apparatus of claim 1 wherein the charging contact means includes:

an AC adaptor having a distal plug means for plugging into an AC power source, conversion means for converting to a DC potential, and a proximal plug means having a potential difference between an inner an outer surface of the proximal plug means;

a pin in electrical contact with the first electrode;

a sprung contact in electrical contact with the second electrode and spaced from said pin, said sprung contact formed of a metal strip bent toward said pin, wherein said sprung contact is adapted to bias against said outer surface of said proximal plug means when said pin is received within said proximal plug means and in electrical contact with said inner surface.

5. The recharging apparatus of claim 1 wherein each of said first and second elongate electrodes includes a pair of electrically conductive rails disposed on either side of said elongate magnetic strip.

6. The recharging apparatus of claim 5, wherein each rail includes a top edge which extends beyond a surface of the housing and a bottom edge in electrical contact with the charging contact means.

7. The recharging apparatus of claim 6 wherein each of said magnetic strips has an upper surface which is below the top edge of the respective pair of electrically conductive rails.

8. The recharging apparatus of claim 1, wherein each of said elongate magnetic strips is sandwiched between a pair of electrically conductive rails and connected to the rails by at least one pin passing through a bore defined through the rails and the magnetic strip.

9. The recharging apparatus of claim 1 wherein each of said magnetic strips has an upper surface which is below the upper edge of the respective adjacent electrode.

10. A recharging apparatus for charging a plurality of units coupled thereto, the apparatus including:

a housing having parallel first and second elongate slots defined therein;

coupling means disposed in said slots for selectively attaching and detaching a plurality of rechargeable units to the housing, said coupling means including a first elongate magnetic strip sandwiched between a first pair of electrically conducting rails and a second elongate magnetic strip sandwiched between a second pair of electrically conducting rails;

charging means for applying a potential difference between said first pair of electrically conducting rails relative to said second pair of electrically conducting rails.

11. The recharging apparatus of claim 10 wherein the first and second magnetic strips are spaced from an upper edge of said respective first and second pairs of electrically conducting rails so that when electrodes of a unit to be charged are placed against the upper edges of the rails, the magnetic strip does not contact the unit but is disposed close enough to the unit so that the unit is held in place on the recharging apparatus by magnetic forces.

12. The recharging apparatus of claim 10 wherein the charging means includes:

an end cap fitted to one end of the housing and having a cutout portion adapted to receive a plug means therein;

a pin in electrical contact with the first electrode, said pin having one end extending through an opening in the end cap into the cutout portion; and a sprung contact in electrical contact with the second electrode, said sprung contact extending though another opening in the end cap into the cutout portion and spaced from said pin, said sprung contact formed of a metal strip bent toward said pin, wherein said sprung contact is adapted to bias against an outer surface of the plug means received within said cutout.

\* \* \* \* \*